United States Patent
Qi et al.

(10) Patent No.: US 12,043,272 B2
(45) Date of Patent: Jul. 23, 2024

(54) RADAR AND CAMERA FUSION BASED WIRELESS COMMUNICATION MISBEHAVIOR DETECTION

(71) Applicant: GM Global Technology Operations LLC, Detroit, MI (US)

(72) Inventors: Wenyuan Qi, Shanghai (CN); Zhengyu Xing, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 17/823,171

(22) Filed: Aug. 30, 2022

(65) Prior Publication Data

US 2024/0034337 A1    Feb. 1, 2024

(30) Foreign Application Priority Data

Jul. 26, 2022    (CN) .......................... 202210885830.1

(51) Int. Cl.
*B60W 50/02*    (2012.01)
*B60W 50/06*    (2006.01)
(Continued)

(52) U.S. Cl.
CPC ........ *B60W 50/0205* (2013.01); *B60W 50/06* (2013.01); *B60W 60/00* (2020.02);
(Continued)

(58) Field of Classification Search
None
See application file for complete search history.

(56) References Cited

U.S. PATENT DOCUMENTS

2018/0167906 A1*  6/2018  Chellamani ............. H04W 4/90
2019/0215695 A1*  7/2019  Yang ..................... H04L 9/3271
(Continued)

FOREIGN PATENT DOCUMENTS

KR    101592788 B1 *  2/2016

OTHER PUBLICATIONS

So et al., Physical Layer Plausibility Checks for Misbehavior Detection in V2X Networks, May 15, 2019, ACM digital library, p. 1-10 (Year: 2019).*
(Continued)

*Primary Examiner* — Justin S Lee
(74) *Attorney, Agent, or Firm* — Vivacqua Crane, PLLC

(57) ABSTRACT

A method of detecting a malicious wireless vehicle-to-everything (V2X) communication includes retrieving perception data from a perception system on an ego vehicle, determining information about nearby objects from the perception data, receiving a first Basic Safety Message (BSM) from a first V2X source and determining if a vehicle location indicated in the first BSM corresponds to a location visible to the ego vehicle. In the event that the vehicle location indicated in the first BSM does not correspond to a location visible to the ego vehicle, the method further includes receiving a second V2X communication from a second V2X source and determining if the second V2X communication indicates a vehicle at the vehicle location indicated in the first BSM. In the event that the second V2X communication does not indicate a vehicle at the vehicle location indicated in the first BSM, the first BSM data is flagged as malicious.

20 Claims, 4 Drawing Sheets

(51) Int. Cl.
*B60W 60/00* (2020.01)
*G08G 1/01* (2006.01)
*G08G 1/052* (2006.01)
*G08G 1/056* (2006.01)

(52) U.S. Cl.
CPC ......... *G08G 1/0112* (2013.01); *G08G 1/0116* (2013.01); *G08G 1/0125* (2013.01); *G08G 1/0141* (2013.01); *G08G 1/052* (2013.01); *G08G 1/056* (2013.01); *B60W 2420/403* (2013.01); *B60W 2420/408* (2024.01); *B60W 2554/4041* (2020.02); *B60W 2554/4044* (2020.02); *B60W 2554/806* (2020.02); *B60W 2556/45* (2020.02)

(56) References Cited

U.S. PATENT DOCUMENTS

| | | | |
|---|---|---|---|
| 2020/0137580 A1* | 4/2020 | Yang | H04W 12/122 |
| 2021/0281986 A1* | 9/2021 | Zhu | H04L 63/1425 |
| 2021/0291849 A1* | 9/2021 | Meng | H04L 63/1425 |
| 2022/0095115 A1* | 3/2022 | Shimizu | H04W 12/104 |
| 2022/0256347 A1* | 8/2022 | Petit | H04W 12/63 |
| 2022/0338012 A1* | 10/2022 | Monteuuis | H04L 67/12 |
| 2023/0059897 A1* | 2/2023 | Miucic | H04W 4/44 |
| 2024/0031259 A1* | 1/2024 | Monteuuis | G08G 1/09675 |

OTHER PUBLICATIONS

Suo et al., Real-time Trust-Building Schemes for Mitigating Malicious Behaviors in Connected and Automated Vehicles, Oct. 2019, IEEE, pp. 1-8 (Year: 2019).*

* cited by examiner

RADAR AND CAMERA FUSION BASED WIRELESS COMMUNICATION MISBEHAVIOR DETECTION

INTRODUCTION

The present disclosure relates to determining the validity of a wireless vehicle-to-everything (V2X) message received by a vehicle.

V2X communications allows a vehicle driver to have awareness of similarly equipped vehicles in proximity to their vehicle. Information shared via V2X can provide warnings of potential hazards and allow the driver to take actions to avoid collisions. To interfere with the benefits of V2X communications, malicious V2X messages may be transmitted in order to induce traffic congestion or collisions.

Thus, while current systems for V2X communications achieve their intended purpose, there is a need for a new and improved system and method for coping with malicious V2X messages.

SUMMARY

According to several aspects, a method of detecting a malicious wireless vehicle-to-everything (V2X) communication includes retrieving perception data from a perception system on an ego vehicle, and determining information about nearby objects from the perception data. The method also includes receiving a first Basic Safety Message (BSM) from a first V2X source, and determining if a vehicle location indicated in the first BSM corresponds to a location visible to the perception system. In the event that the vehicle location indicated in the first BSM does not correspond to a location visible to the perception system, the method includes receiving a second V2X communication from a second V2X source distinct from the first V2X source and determining if the second V2X communication indicates a vehicle at the vehicle location indicated in the first BSM. In the event that the second V2X communication does not indicate a vehicle at the vehicle location indicated in the first BSM, the method includes flagging the first BSM data as malicious.

In an additional aspect of the present disclosure, the first BSM includes time, location, speed, and heading of a nearby vehicle.

In another aspect of the present disclosure, the information about nearby objects determined from the perception data includes distance, speed, and heading estimates relative to the location of the ego vehicle.

In another aspect of the present disclosure, the method further includes performing a secondary check on the first BSM.

In another aspect of the present disclosure, the secondary check includes a vehicle speed plausibility check.

In another aspect of the present disclosure, the secondary check includes a message consistency check.

In another aspect of the present disclosure, the second V2X source is a roadside unit.

In an additional aspect of the present disclosure, a sensor self-check is performed prior to receiving the second V2X communication from the second V2X source.

In another aspect of the present disclosure, the method further includes refining sensor parameters of sensors in the perception system.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
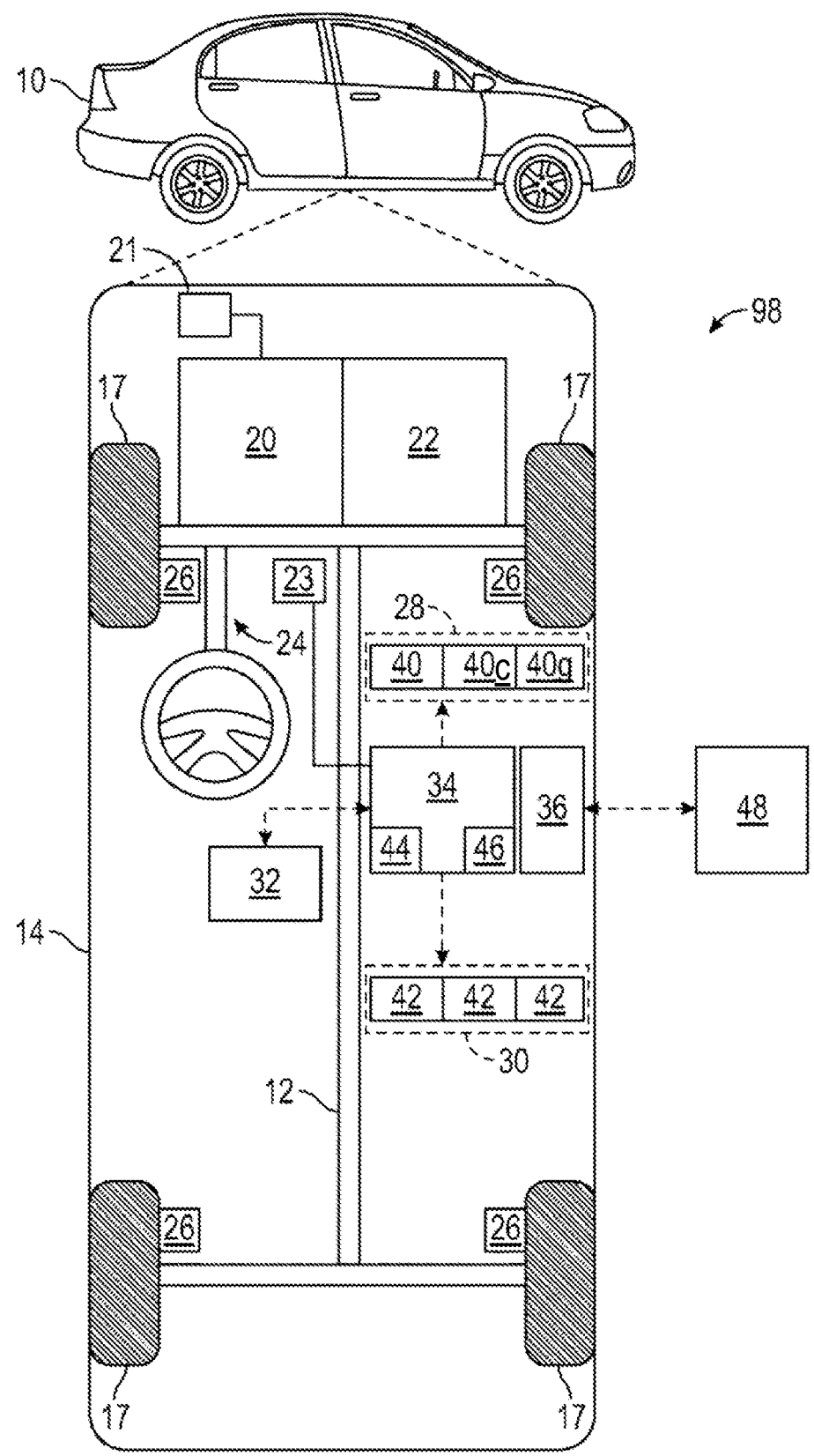
FIG. 1 is a schematic block diagram of a vehicle according to an exemplary embodiment.

The following detailed description is merely exemplary in nature and is not intended to limit the application and uses. Furthermore, there is no intention to be bound by expressed or implied theory presented in the preceding technical field, background, brief summary or the following detailed description. As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Many vehicles come equipped with sensors such as radars, cameras, ultrasonic sensors and lidars to detect objects around the vehicle and either inform the driver of their presence or take actions to avoid collisions, such as automatically braking. Vehicle-to-vehicle (V2V) wireless communication can enhance vehicle safety by allowing one vehicle to exchange real-time information about speed, location and direction with other nearby vehicles. As used herein, the term "ego vehicle" refers to the subject connected and/or automated vehicle, the behavior of which is of primary interest in operational scenarios.

V2V enables an enhanced level of safety by allowing the ego vehicle and another connected vehicle to electronically communicate with each other, up to a range of about 300 meters, even if other objects are blocking line-of-sight. This ability to "see around corners" can be an important safety feature in a variety of common driving scenarios. Examples of scenarios where V2V can enhance safety include but are not limited to the ego vehicle and another vehicle approaching each other on a blind curve or a blind intersection, seeing around a large truck that is in front of the ego vehicle so it knows it can safely pass, providing information regarding cars ahead of the ego vehicle that are suddenly braking in heavy traffic, recognizing cars coming out of a driveway or a parking spot, and alerting the driver of the ego vehicle that a vehicle up ahead has come to complete stop to make a left turn. With timely notification, the driver of the ego vehicle may be able to adjust vehicle speed and/or heading to reduce the probability of a collision.

The term vehicle-to-everything (V2X) as used herein includes multiple forms of wireless communication with the ego vehicle including V2V, vehicle-to-infrastructure (V2I), vehicle-to-pedestrian (V2P), and the like.

As depicted in FIG. 1, a vehicle 10 that can be considered an ego vehicle generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

The vehicle 10 is depicted in the illustrated embodiment as a passenger car, but it should be appreciated that another vehicle including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The sensor system 28 includes one or more sensors 40 (i.e., sensing devices) that sense observable conditions of the exterior environment and/or the interior environment of the vehicle 10. The sensors 40 may include, but are not limited to, radars, lidars, global positioning systems, optical cameras, thermal cameras, ultrasonic sensors, and/or other sensors. The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). The sensor system 28 includes one or more Global Positioning System (GPS) transceiver configured to detect and monitor the route data (i.e., route information). The GPS transceiver 40g is configured to communicate with a GPS to locate the position of the vehicle 10 in the globe. The GPS transceiver 40g is in electronic communication with the controller 34. Because the sensor system 28 provides object data to the controller 34, the sensor system 28 and its sensors are considered sources of information (or simply sources). The sensor system 28 also includes one or more optical cameras 40c. The representation of the optical camera 40c in FIG. 1 is intended merely to show the inclusion of the optical camera 40c and is not intended to imply any limitations on the location or the field of view of the optical camera 40c.

The data storage device 32 stores data for use in automatically controlling the vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer non-transitory readable storage device or media 46. The processor 44 can be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of known memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the control system 98. The vehicle 10 includes a user interface 23, which may be a touchscreen in the dashboard. The user interface 23 is in electronic communication with the controller 34 and is configured to receive inputs by a user (e.g., vehicle operator). Accordingly, the controller 34 is configured receive inputs from the user via the user interface 23. The user interface 23 includes a display configured to display information to the user (e.g., vehicle operator or passenger).

The communication system 36 is configured to wirelessly communicate information to and from other entities 48, such as but not limited to, other vehicles ("V2V" communication), infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or transceivers for receiving and/or transmitting signals, such as cooperative sensing messages (CSMs).

FIG. 1 includes a schematic block diagram of the control system 98, which is configured to control the vehicle 10. The controller 34 of the control system 98 is in electronic communication with the braking system 26, the propulsion system 20, and the sensor system 28. The braking system 26 includes one or more brake actuators (e.g., brake calipers) coupled to one or more wheels 17. Upon actuation, the brake actuators apply braking pressure on one or more wheels 17 to decelerate the vehicle 10. The propulsion system 20 includes one or more propulsion actuators for controlling the propulsion of the vehicle 10. For example, as discussed above, the propulsion system 20 may include an internal combustion engine and, in that case, the propulsion actuator may be a throttle specially configured to control the airflow in the internal combustion engine. The sensor system 28 may include one or more accelerometers (or one or more gyroscopes) coupled to one or more wheels 17. The accelerometer is in electronic communication with the controller 34 and is configured to measure and monitor the longitudinal and lateral accelerations of the vehicle 10. The sensor system 28 may include one or more speed sensors configured to measure the speed (or velocity) of the vehicle 10. The speed sensor is coupled to the controller 34 and is in electronic communication with one or more wheels 17.

Figure 2:
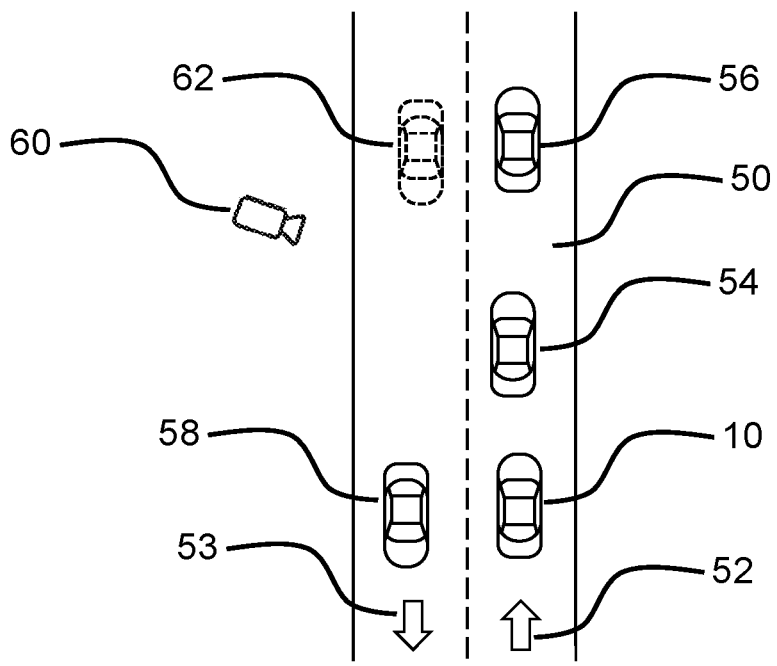
FIG. 2 and FIG. 3 are diagrams of hypothetical scenarios in which an ego vehicle is in the vicinity of other vehicles according to an exemplary embodiment.

Referring to FIG. 2, the vehicle 10 is an ego vehicle depicted in a traffic scenario on a two-lane road 50. Traffic flow direction for each of the two lanes is indicated by the arrows 52 and 53. FIG. 2 also depicts vehicles 54 and 56 ahead of the ego vehicle 10 travelling in the same direction as the ego vehicle 10. Another vehicle 58 is shown traveling in the opposite direction from the travel direction of the ego vehicle 10. A roadside unit (RSU) is shown adjacent to the roadway 50. The RSU 60 contains sensors such as one or more cameras and/or one or more LIDAR sensors capable of detecting the positions, speeds, and/or headings of nearby vehicles 10, 54, 56, 58 that are on the roadway 50. The RSU 60 also includes communication means allowing the RSU 60 to broadcast the positions, speeds, and/or headings of nearby detected vehicles 10, 54, 56, 58 by any of several available protocols, including but not limited to cellular (4G/5G), dedicated short-range communications (DSRC), and cellular-vehicle-to-everything (C-V2X).

A vehicle outline 62 is also indicated in FIG. 2 using dashed lines. The dashed lines associated with vehicle 62 indicate that vehicle 62 does not actually exist, but rather is a "ghost" vehicle created by a malicious entity. In a Sybil attack, a malicious entity forges a large number of fake identities in order to disrupt the proper functioning of V2X applications, broadcasting a V2X signal to make it appear that a real vehicle exists at the location indicated for the ghost vehicle 62. A malicious entity could generate false traffic information that differs from real-world information and broadcast it to the V2X network with the intention of disrupting road traffic or triggering a collision. With continued reference to FIG. 2, the vehicle 54 in front of the ego vehicle 10 may block the view of the left lane from the driver of the ego vehicle A malicious V2X broadcast communicating the presence of the (nonexistent) ghost vehicle 62 could conceivably affect decisions by the driver of the ego vehicle 10, such as whether or not to initiate a passing maneuver around the vehicle 54.

Figure 3:
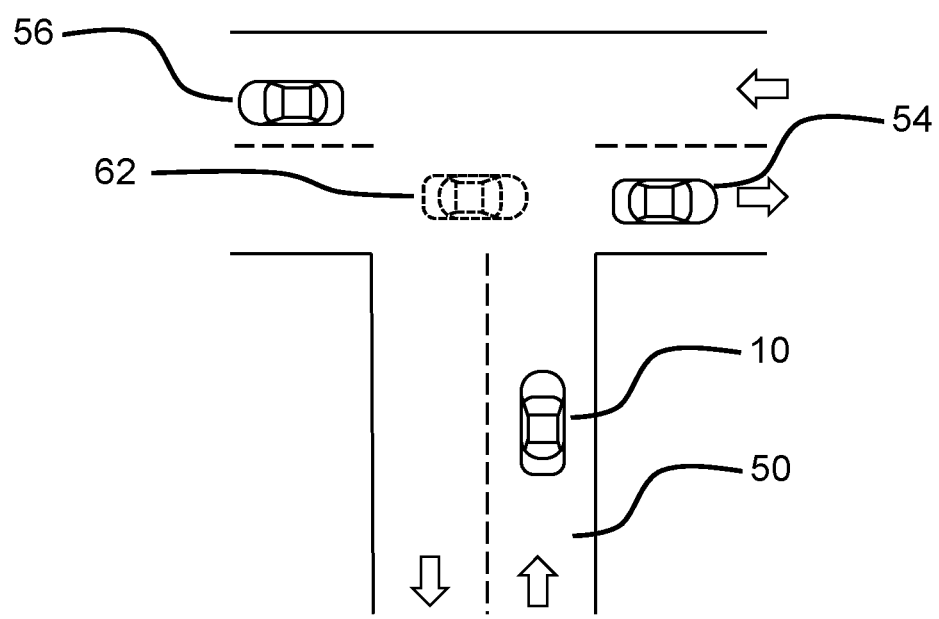

Referring to FIG. 3, a traffic scenario at an intersection is depicted. The ego vehicle 10 is approaching the intersection, and other vehicles 54 and 56 are driving on the cross street. A ghost vehicle 62 is also depicted with a dashed outline. As described earlier with respect to FIG. 2, the ghost vehicle 62 does not actually exist, but rather is a perceived as a vehicle due to V2X communications broadcasted by a malicious entity. Based on the malicious V2X communications the ego vehicle 10 may react by slowing down and/or braking hard, and may not enter the intersection. The result is degradation of traffic efficiency, and may even result in a traffic collision. If the ego vehicle 10 can determine that the ghost vehicle 62 is not real but is rather an artifact of a malicious V2X communication, the ego vehicle 10 can safely ignore the ghost vehicle 62 and keep driving as normal.

Figure 4:
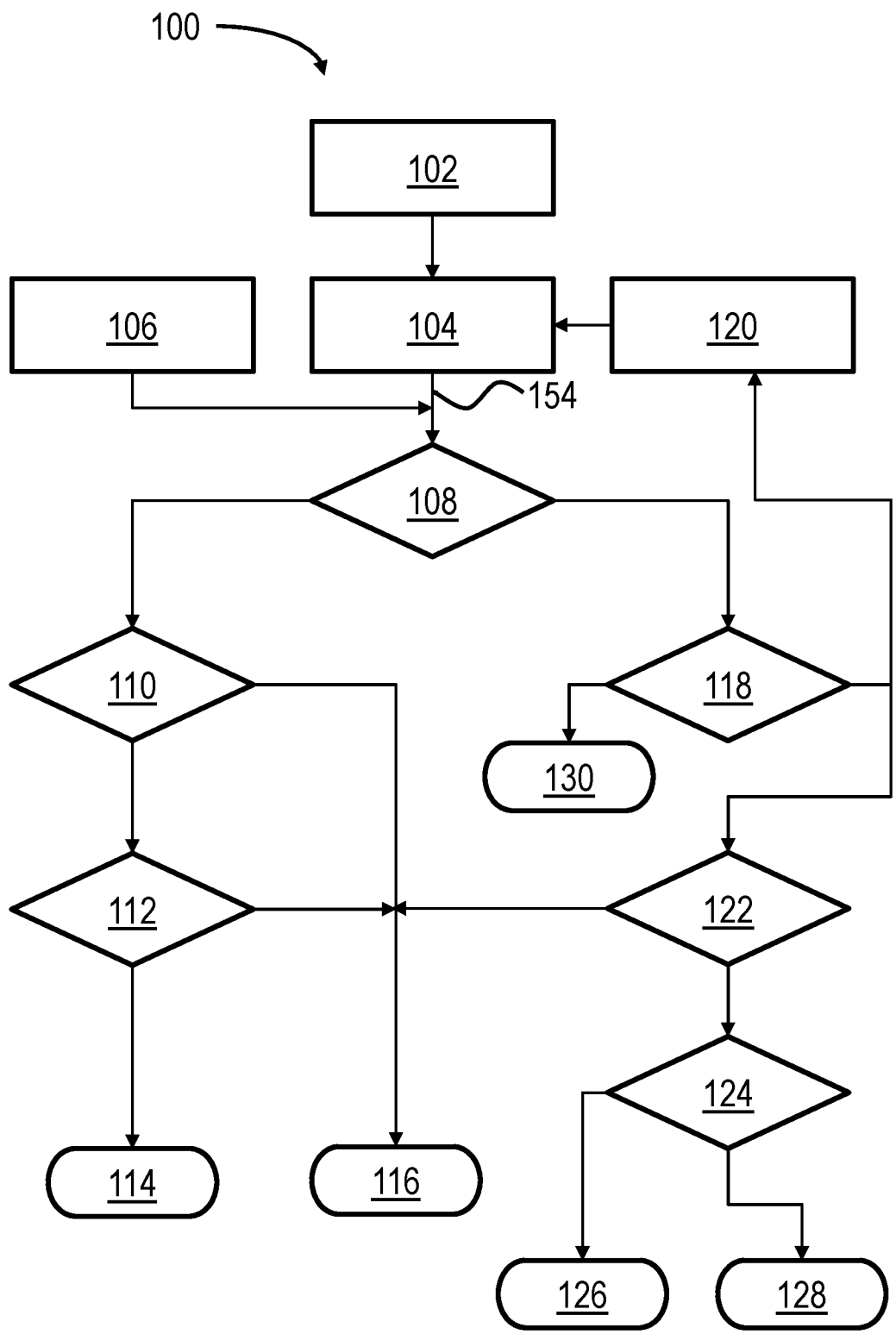
FIG. 4 is a flow chart of an algorithm for V2X misbehavior detection according to an exemplary embodiment.

Referring to FIG. 4, a flow chart of an algorithm 100 for V2X misbehavior detection is presented. The steps of algorithm 100 are executed in the controller 34 described relative to FIG. 1. As discussed with reference to FIG. 1, the ego vehicle 10 includes a perception system comprising one or more optical cameras 40c and/or lidar sensors and/or ultrasonic sensors that enable recognition of nearby objects in the line-of-sight of the ego vehicle 10. In step 102, the ego vehicle 10 retrieves perception data from the perception system. The perception data from step 102 is provided as a signal 154 to a sensor fusion step 104 to provide distance, speed, and heading estimates of nearby objects relative to the location of the ego vehicle 10, as will be discussed further with reference to FIG. 5. In step 106 a Basic Safety Message (BSM) is received from a nearby vehicle. Information included in the BSM includes time, latitude, longitude, elevation, speed, heading, acceleration, and size of the nearby vehicle. In step 108, a determination is made as to whether or not the location indicated in the BSM data corresponds to an object visible to the ego vehicle based on the sensor fusion data in step 104. If the determination in step 108 is that the BSM location is in the visible area based on sensor fusion data, the algorithm proceeds from step 108 to step 110.

In step 110 a determination is made as to whether or not the information provided in the BSM data matches a visible vehicle. If not, the algorithm proceeds to step 116, where the BSM data is flagged as malicious. If the information provided in the BSM data matches a visible vehicle, the algorithm 100 proceeds from step 110 to step 112. In step 112, a secondary check, for example a vehicle speed plausibility check or a message consistency check, is performed on the BSM data. If the BSM data passes the secondary check in step 112, the algorithm passes to step 114, where the BSM data is flagged as trustworthy. If the BSM data fails the secondary check in step 112, the algorithm passes to step 116, where the BSM data is flagged as malicious.

With continued reference to FIG. 4, if the determination in step 108 is that the BSM location is not in the visible area based on sensor fusion data, the algorithm proceeds from step 108 to step 118. In step 118, a sensor self-check is performed to verify the proper operation of the camera and/or lidar sensors and/or ultrasonic sensors that provided the perception data in step 102. If the sensor self-check in step 118 indicates a problem with a sensor, the algorithm proceeds to step 130. In step 130, notification of a sensor problem is generated to indicate the need for sensor repair, and misbehavior system operation is degraded to only use a secondary check, for example a vehicle speed plausibility check or a message consistency check.

If the sensor self-check in step 118 indicates proper operation of all sensors, the algorithm proceeds to a sensor refinement step 120. In sensor refinement step 120, sensor calibration parameters such as range, scope, and field of view are refined for the perception sensors that provided the perception data in step 102, and the refined parameters are provided from step 120 to sensor fusion step 104. Meanwhile, the algorithm executes step 122, where a secondary check, for example a vehicle speed plausibility check or a message consistency check, is performed on the BSM data. If the BSM data fails the secondary check in step 122, the algorithm passes to step 116, where the BSM data is flagged as malicious. If the BSM data passes the secondary check in step 122, the algorithm passes to step 124, where the BSM data is compared to data received from other sources, for example from the roadside unit 60. If the BSM data can be correlated to the other data with a high degree of confidence, the algorithm proceeds to step 126 where the BSM data is flagged as trustworthy. If the BSM data cannot be correlated to the other data with a high degree of confidence, the algorithm proceeds to step 128 where the BSM data is flagged as trustworthy.

Figure 5:
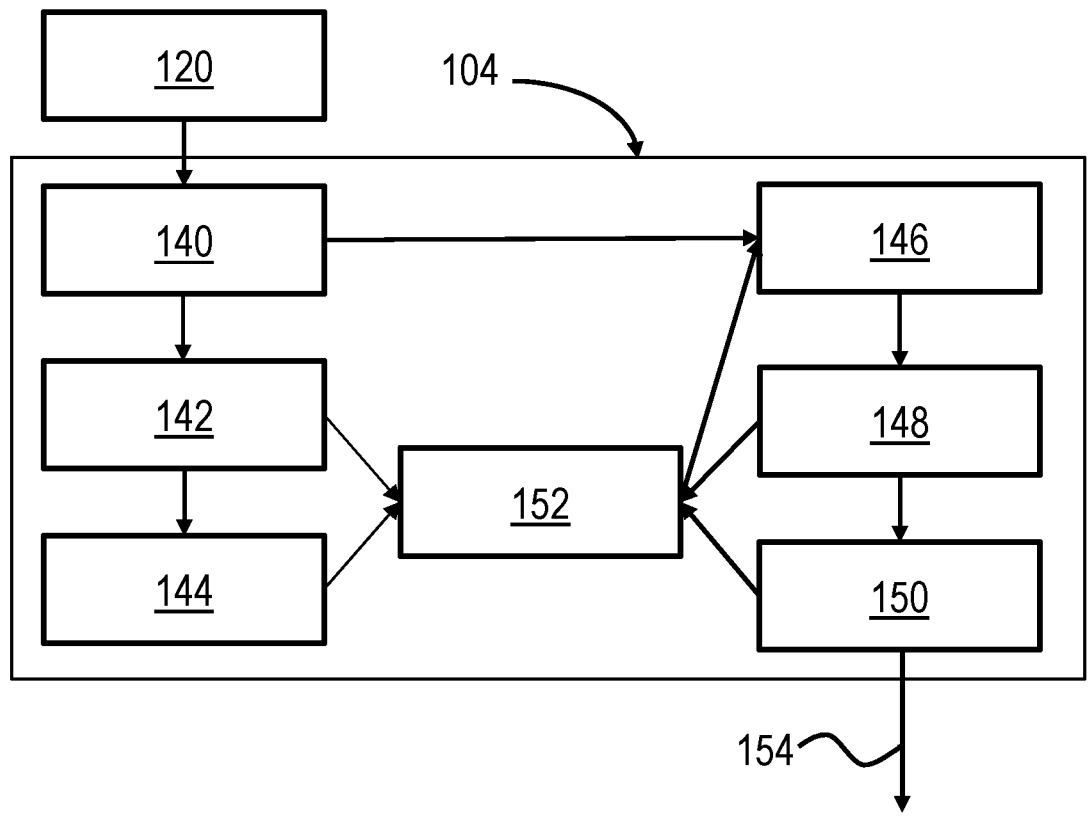
FIG. 5 is a diagram showing details of the sensor fusion component in the flow chart of FIG. 4.

Referring to FIG. 5 as well as FIG. 4, a flow chart is presented that provides further description regarding elements of the sensor fusion step 104. As discussed relative to FIG. 4, in sensor refinement step 120 sensor calibration parameters such as range, scope, and field of view are refined for the perception sensors that provided the perception data in step 102, in order to gain a better understanding of objects surrounding the ego vehicle 10. The refined parameters are provided to element 140 within step 104, where calibration and synchronization are needed if multiple sensors do not share the same capture time tick. If time is not fully synchronized, a Kalman filter 146 is used to calculate the gain matrix for further reference. Following calibration and synchronization in element 140, deep learning-based camera recognition algorithm takes place in element 142 and radar or lidar point cloud generation takes place in element 144. The resulting information about detected objects, including object type, heading, and estimated distance, is saved in shared memory 152. The shared memory 152 is accessible from a plurality of electronic control units (ECU) to allow multiple processes to access information without increasing input/output times and costs.

With continued reference to FIG. 5, in element 148 points in the radar/lidar point cloud generated in element 144 that are outside the camera detected area are filtered out. Based on the fused data, distance estimation to nearby objects is performed in element 150. The results from the sensor fusion step 104 including bounding box, object type, heading, object features, distance, estimated GPS coordinates, and relative speed are provided to the determination step 108 as a signal 154 as shown in FIG. 4 and in FIG. 5.

Figure 6:
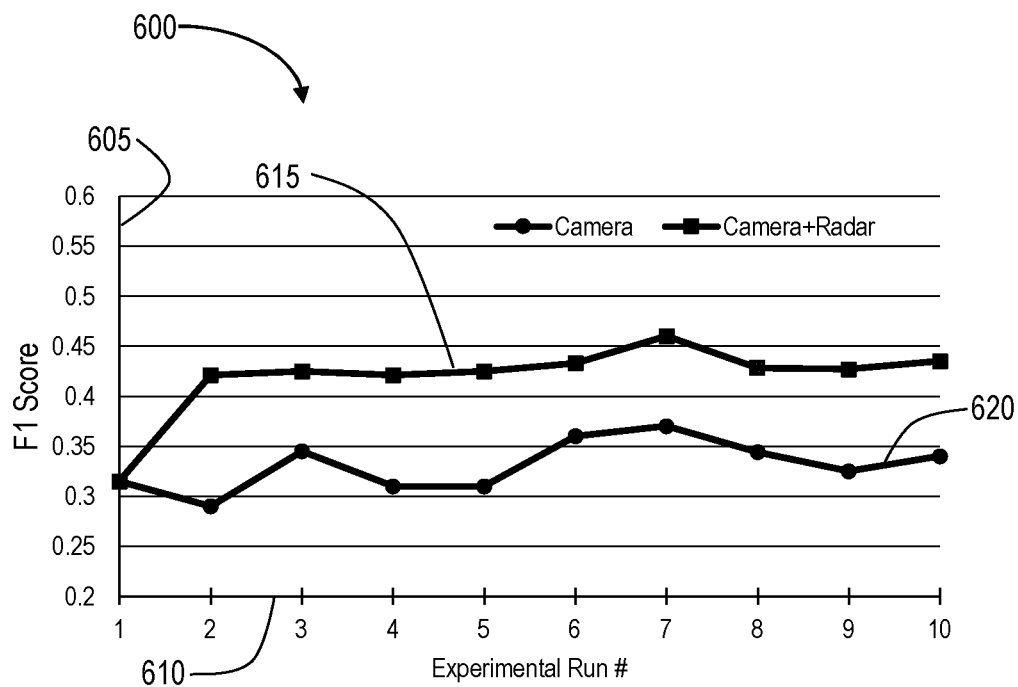
FIG. 6 is a presentation of results from a proof-of-concept experiment comparing misbehavior detection using a proposed sensor fusion algorithm and a camera-only algorithm.

FIG. 6 presents results from an evaluation of a misbehavior detection (MDB) algorithm 100 as disclosed herein in an Intersection Movement Assist (IMA) scenario. To obtain the evaluation results presented in FIG. 6, the MDB algorithm 100 was simulated with non-perfect camera and radar sensor enhancement. This allows consideration of camera-based recognition not being 100 percent accurate, and MDB accuracy being limited by the vision-based recognition accuracy and radar accuracy. The experimental results are based on a hardware-in-loop (HIL) simulation system emulating real characteristics of physical sensors. The results are presented as a graph 600 of F1 scores, plotted according to the scale on the vertical axis 605, for each of ten individual experimental runs, plotted along the horizontal axis 610. The F1 score is defined as the harmonic mean of precision and recall. In calculating the F1 score, precision indicates the percentage of everything that has been predicted as a positive that is truly a positive, i.e. (#of True Positives/(#of True Positives+#of False Positives)), and recall indicates what percentage of everything that is truly a positive is identified as a positive, i.e., (#of True Positives/(#of True Positives+#of False Negatives)).

Referring to FIG. 6, F1 scores for the MBD algorithm 100 disclosed herein are plotted as data series 615, wherein the MDB detection is based on both camera and radar data. For comparison purposes, F1 scores for an algorithm based on camera data without radar data is presented as data series 620. The results in FIG. 6 show that the MDB algorithm 100 disclosed herein produced higher F1 scores than the baseline camera-only algorithm, indicating that the MDB algorithm 100 disclosed herein provides superior recognition of a Sybil attack ghost vehicle in IMA scenarios.

A method and system of the present disclosure for detecting misbehavior in V2X communications offers several advantages. These include potentially avoiding traffic congestion or accidents that would result from accepting a malicious indication of a ghost vehicle as a true indication of a nearby vehicle. Additionally, in some aspects, the ego vehicle can also be a provider of information regarding recognized malicious V2X messages to benefit other vehicles.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of detecting a malicious wireless vehicle-to-everything (V2X) communication, the method comprising:
    retrieving perception data from a perception system on an ego vehicle;
    utilizing a sensor fusion process to extract information about nearby objects from the perception data;
    receiving a first Basic Safety Message (BSM) from a first V2X source;
    determining if a vehicle location indicated in the first BSM corresponds to a location visible to the perception system;
    in the event that the vehicle location indicated in the first BSM does not correspond to a location visible to the perception system, receiving a second V2X communication from a second V2X source distinct from the first V2X source and determining if the second V2X communication indicates a vehicle at the vehicle location indicated in the first BSM; and
    in the event that the second V2X communication does not indicate a vehicle at the vehicle location indicated in the first BSM, flagging the first BSM data as malicious.

2. The method of claim 1, wherein the first BSM includes time, location, speed, and heading of a nearby vehicle.

3. The method of claim 1, wherein the information about nearby objects determined from the perception data includes distance, speed, and heading estimates relative to the location of the ego vehicle.

4. The method of claim 1, further comprising performing a secondary check on the first BSM.

5. The method of claim 4, wherein the secondary check comprises a vehicle speed plausibility check.

6. The method of claim 4, wherein the secondary check comprises a message consistency check.

7. The method of claim 1, wherein the second V2X source is a roadside unit.

8. The method of claim 1, further comprising performing a sensor self-check prior to receiving the second V2X communication from the second V2X source.

9. The method of claim 1, further comprising refining sensor parameters of sensors in the perception system.

10. The method of claim 1, wherein the sensor fusion process includes accessing shared memory by a plurality of electronic control units.

11. A system comprising
    an ego vehicle having a perception system, and
    a controller configured to:
    retrieve perception data from the perception system;
    utilize a sensor fusion process to extract information about nearby objects from the perception data;
    receive a first Basic Safety Message (BSM) from a first vehicle-to-everything (V2X) source;
    determine if a vehicle location indicated in the first BSM corresponds to a location visible to the perception system;
    in the event that the vehicle location indicated in the first BSM does not correspond to a location visible to the perception system, receive a second V2X communication from a second V2X source distinct from the first V2X source and determine if the second V2X communication indicates a vehicle at the vehicle location indicated in the first BSM; and
    in the event that the second V2X communication does not indicate a vehicle at the vehicle location indicated in the first BSM, flag the first BSM data as malicious.

12. The system of claim 11, wherein the first BSM includes time, location, speed, and heading of a nearby vehicle.

13. The system of claim 11, wherein the information about nearby objects determined from the perception data includes distance, speed, and heading estimates relative to the location of the ego vehicle.

14. The system of claim 11, wherein the controller is further configured to perform a secondary check on the first BSM.

15. The system of claim 14, wherein the secondary check comprises a vehicle speed plausibility check.

16. The system of claim 14, wherein the secondary check comprises a message consistency check.

17. The system of claim 11, wherein the second V2X source is a roadside unit.

18. The system of claim 11, wherein the controller is further configured to perform a sensor self-check prior to receiving the second V2X communication from the second V2X source.

19. The system of claim 11, wherein the controller is further configured to refine sensor parameters of sensors in the perception system.

20. The system of claim 11, wherein the sensor fusion process includes accessing shared memory by a plurality of electronic control units.

* * * * *